(12) United States Patent
Wang et al.

(10) Patent No.: US 10,757,177 B1
(45) Date of Patent: Aug. 25, 2020

(54) DATA LOCALITY-AWARE MAPREDUCE USING IOT DEVICES

(71) Applicant: Amazon Technologies, Inc., Seattle, WA (US)

(72) Inventors: Feng Wang, Seattle, WA (US); Chen Yang, Mercer Island, WA (US); Calvin Yue-Ren Kuo, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 15/716,033

(22) Filed: Sep. 26, 2017

(51) Int. Cl.
*H04L 29/08* (2006.01)

(52) U.S. Cl.
CPC ...... *H04L 67/1008* (2013.01); *H04L 67/1021* (2013.01); *H04L 67/12* (2013.01); *H04L 67/322* (2013.01)

(58) Field of Classification Search
CPC . H04L 67/1021; H04L 67/1008; H04L 67/12; H04L 67/322
See application file for complete search history.

(56) References Cited

U.S. PATENT DOCUMENTS

| | | | |
|---|---|---|---|
| 8,924,978 B2 | 12/2014 | Meng et al. | |
| 8,972,986 B2 | 3/2015 | Palanisamy et al. | |
| 9,128,763 B2 | 9/2015 | Sarkar et al. | |
| 9,886,310 B2* | 2/2018 | Fuller | G06F 9/5011 |
| 2015/0254322 A1* | 9/2015 | Ma | G06F 9/5066 |
| | | | 707/603 |
| 2018/0046503 A1* | 2/2018 | Feng | G06F 9/5033 |

* cited by examiner

*Primary Examiner* — Nam T Tran
(74) *Attorney, Agent, or Firm* — Robert C. Kowert; Kowert, Hood, Munyon, Rankin & Goetzel, P.C.

(57) ABSTRACT

A client network implements data locality-aware MapReduce using IoT devices. An IoT service of a provider network receives configuration settings from a user to implement map nodes and reduce nodes at the client network. Each map node is configured to receive its own locality-based partition of data from one or more data sources (e.g., sensors) that are within a map function data locality (e.g., a particular location of the network). Each map node then processes the locality-based partition of the data, generates results, and sends the results to a reduce node. The reduce node may be located at a remote provider network. A coordinator node may also be deployed to one or more devices of the client network. If a map node or a compute node becomes overloaded, the coordinator node may redirect some data to a map node or a reduce node of a remote provider network.

20 Claims, 8 Drawing Sheets

US 10,757,177 B1

DATA LOCALITY-AWARE MAPREDUCE USING IOT DEVICES

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, environmental sensors, etc.

Due to the large volume of data generated across numerous IoT devices, it may be helpful to aggregate the generated data in a cloud service. For example, data from many different IoT devices may be processed by a cloud service using data processing techniques such as MapReduce, which is a framework that can be used in big data analysis. However, the cost associated with transferring huge volumes of data to a centralized cloud service is high, both in terms of bandwidth used and amount of time required. Furthermore, in some cases it may be difficult if not impossible to send a large volume of data to the cloud when internet access is limited (e.g., due to a slow or intermittent connection) or is prohibited (e.g., due to regulatory constraints).

Figure 1:
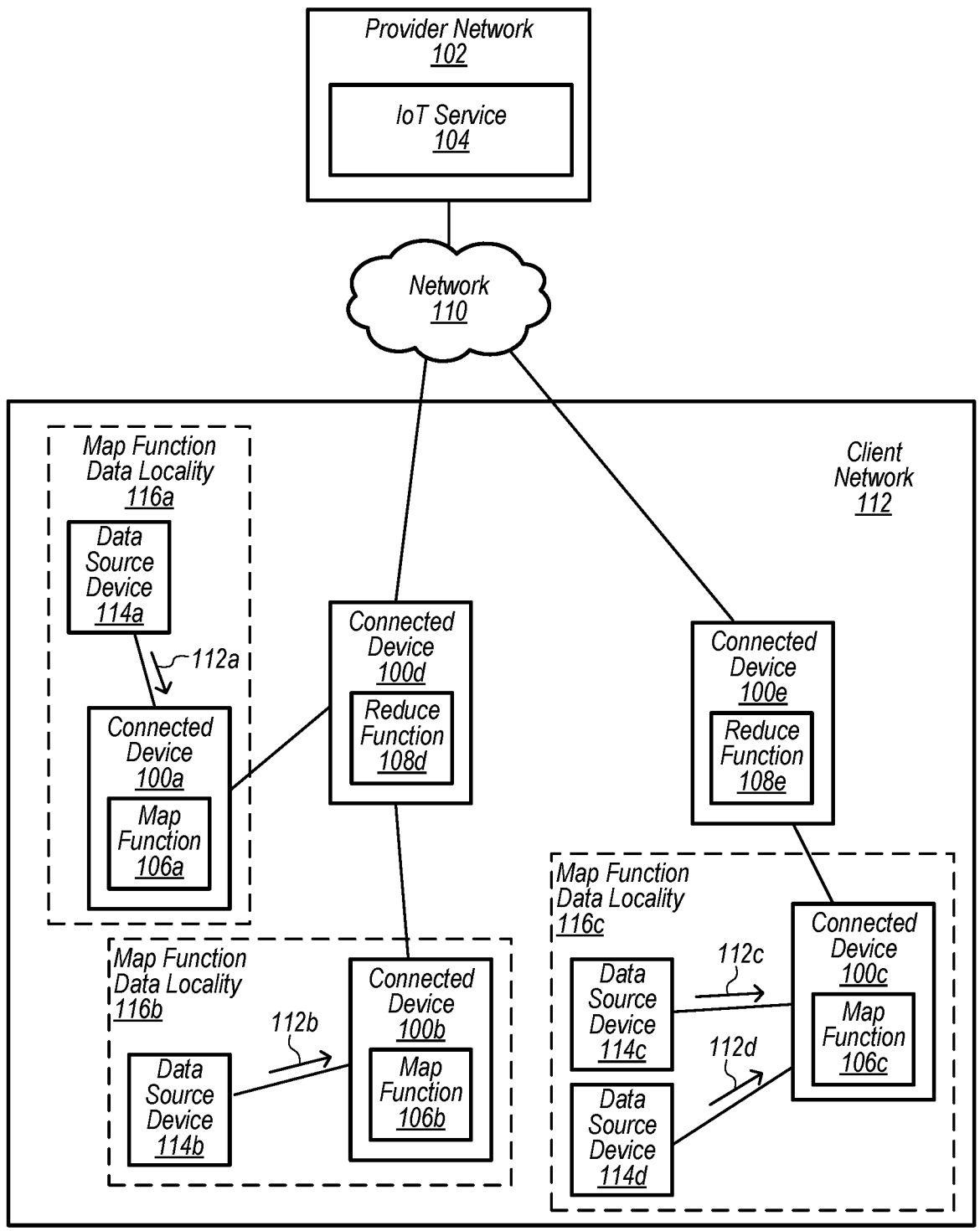
FIG. 1 illustrates a system for data locality-aware MapReduce using IoT devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement data locality-aware MapReduce using IoT devices. A service provider may deploy map functions and reduce functions to respective connected devices (e.g., IoT devices) of a client network. Each map function running on a connected device (e.g., "map node") may receive a respective locality-based partition of data from one or more data sources (e.g., from one or more sensors that share a physical location with a map node). Thus, each map function at each connected device obtains a locality-based partition of a larger amount of data that is obtained by multiple map nodes at different locations of the network. Each of the map nodes processes the respective locality-based partition to generate respective results, which are then sent to a reduce node.

In embodiments, a "map node" may refer to a map function running on a connected device. In some embodiments, an "endpoint" may be one or more computing devices and/or one or more services that are part of a local network or a remote network, such that information may be transmitted to or from the endpoint via one or more network connections.

By implementing data locality-aware MapReduce using IoT devices, various embodiments allow for advantages over traditional MapReduce techniques. For example, instead of sending data to the cloud only to be mapped into different partitions, embodiments start with a partition that is local to where the data is generated. This takes advantage of the natural division of data due to the distributed nature of data sources and associated map nodes. Thus, MapReduce can be implemented locally, where data is actually collected. Map and reduce functions can be deployed locally onto IoT devices with sufficient compute power (e.g., "connected devices") to form a MapReduce "pipeline." Data generated by data source devices (e.g., sensors) locally connected to the connected devices is then processed by the MapReduce pipeline. This greatly reduces time and the bandwidth required to transfer large volumes of data, and allows MapReduce processing to occur even in environments with limited or no internet access. In some embodiments, if the local MapReduce pipeline becomes overloaded, at least some work can be offloaded to a cloud service in order to prevent interruption of MapReduce processing.

FIG. 1 illustrates a system for data locality-aware MapReduce using IoT devices, according to some embodiments. The connected devices 100 depicted in FIG. 1 may be the same type of connected device, and include some or all of the same components as other connected devices depicted in FIGS. 1-7, in embodiments. Although certain components of the provider network 102 and/or the IoT service 104 are described as performing various actions, any of the actions described as performed by the provider network 102 and/or the IoT service 104 may be performed by any particular component of the provider network 102, the IoT service 104, or any components of the networks in FIGS. 1-11.

In the depicted embodiment, a provider network 102 includes an IoT service 104 that may be used to configure and deploy map functions 106 and/or reduce functions 108 via a wide-area network 110 (e.g., the Internet) to respective connected devices 100 of a client network 112 to operate as map nodes and/or reduce nodes of a MapReduce system. As shown connected devices 100*a*, 100*b*, and 100*c* respectively include map functions 106*a*, 106*b*, and 106*c*. Further, connected devices 100*d* and 100*e* respectively include reduce functions 108*d* and 108*e*.

One or more data source devices 114 provide locality-based data 112 to each respective connected device 100. Data source device 114*a* sends locality-based data 112*a* to connected device 100*a*, data source device 114*b* sends locality-based data 112*a* to connected device 100*b*, and data source devices 114*c* and 114*d* send locality-based data 112*c* and 112*d*, respectively, to connected device 100*c*.

As depicted, the data source device 114*a* and the connected device 100*a* are assigned to the same map function data locality 116*a*. In embodiments, data source device 114*a* and connected device 100*a* may be assigned to the same map function data locality 116*a* by a client during configuration of the MapReduce system because data source device 114*a* and connected device 100*a* are at the same physical location and/or area (e.g., within a threshold distance of each other). In embodiments, the threshold distance may be a physical distance or a communication distance (e.g., a threshold time for data to be communicated between the devices).

In some embodiments, a client may assign the data source device 114*a* and connected device 100*a* may to the same map function data locality 116*a* for other reasons or based on taking into account one or more other or additional factors, such as the availability of the connected device 100*a* to be used and/or performance specifications of the connected device 100*a*. Thus, a client may assign one or more data source devices 114 and a connected device 100 to the same map function locality 116 for any reason. Therefore, in embodiments, a given map function data locality may represent a logical association between one or more data source devices 114 and a connected device 100, without requiring any particular location constraints (e.g., the devices may be located in different countries or continents).

Similarly, for any of the above reasons, the data source device 114*b* and the connected device 100*b* are assigned to the same map function data locality 116*a*, and data source device 114*c*, data source device 114*d*, and connected device 100*b* are assigned to the same map function data locality 116*c*. Thus, the assignments to map function data localities may be made based on physical proximity of respective data source devices and connected devices, while in some cases the assignments are made to simply assign certain data source devices to certain connected devices (e.g., map functions). As described below, some or all of the data received by a particular connected device (e.g., by a map function) from one or more data sources that are assigned to the same map function data locality may be processed by the map function as a locality-based partition of data (e.g., a partition of data that is formed by combining data received from one or more data sources assigned to the same map function data locality as the map function/connected device).

During operation, the map function 106*a* receives locality-based data 112*a* as a locality-based partition of data and processes the locality-based partition of data. As depicted, the locality-based partition of data may be a partition of data that includes data 112*a*, data 112*b*, data 112*c*, and data 112*d*. Thus, the data collected by each of the connected devices 100 is a locality-based partition of the overall data that is collected by all of the connected devices 100*a*, 100*b*, 100*c* (e.g., collected over a particular period of time).

Similarly, the map function 106*b* receives locality-based data 112*b* as a locality-based partition of data and processes the locality-based partition of data. As shown, the map function 106*c* receives locality-based data 112*c* and locality-based data 112*d* as a locality-based partition of data and processes the locality-based partition of data. Thus, in embodiments, the map function 106*c* and/or the connected device 100*c* may first combine locality-based data 112*c* and 112*d* into one locality-based partition of data, and then process the data according to the map function. Thus, in various embodiments, any number of data source devices may provide locality-based data to a particular connected device and/or map function, which may then combine the received locality-based data from the different data source devices into one locality-based partition of data.

In embodiments, the map function 106*a* produces one or more results that are transmitted to the connected device 100*d*. The reduce function 108*d* processes the one or more results and may send them to the provider network or another endpoint for further processing (e.g., additional reduce processing or aggregation) or for output (e.g., to a file or display screen). Likewise, the map function 106*b* produces one or more results that are transmitted to the connected device 100*d*. The reduce function 108*d* processes the one or more results and may send them to the provider network or another endpoint for further processing or for output. Similarly, the map function 106*c* produces one or more results that are transmitted to the connected device 100*e*. The reduce function 108*e* processes the one or more results and may send them to the provider network or another endpoint for further processing or for output.

In some embodiments, results of one or more map functions and/or one or more reduce functions may be used by the local client network to make local decisions or perform one or more actions (e.g., cause one or more devices to turn on or off, transmit one or more signals or commands, etc.). In embodiments, results from one or more map and/or reduce functions may be processed locally by one or more machine learning models (e.g., neural networks or other data processing models) running on local computing devices (e.g., one or more connected devices). Based on the results of the local processing, one or more local decisions or actions may be performed, as described above.

Figure 2:
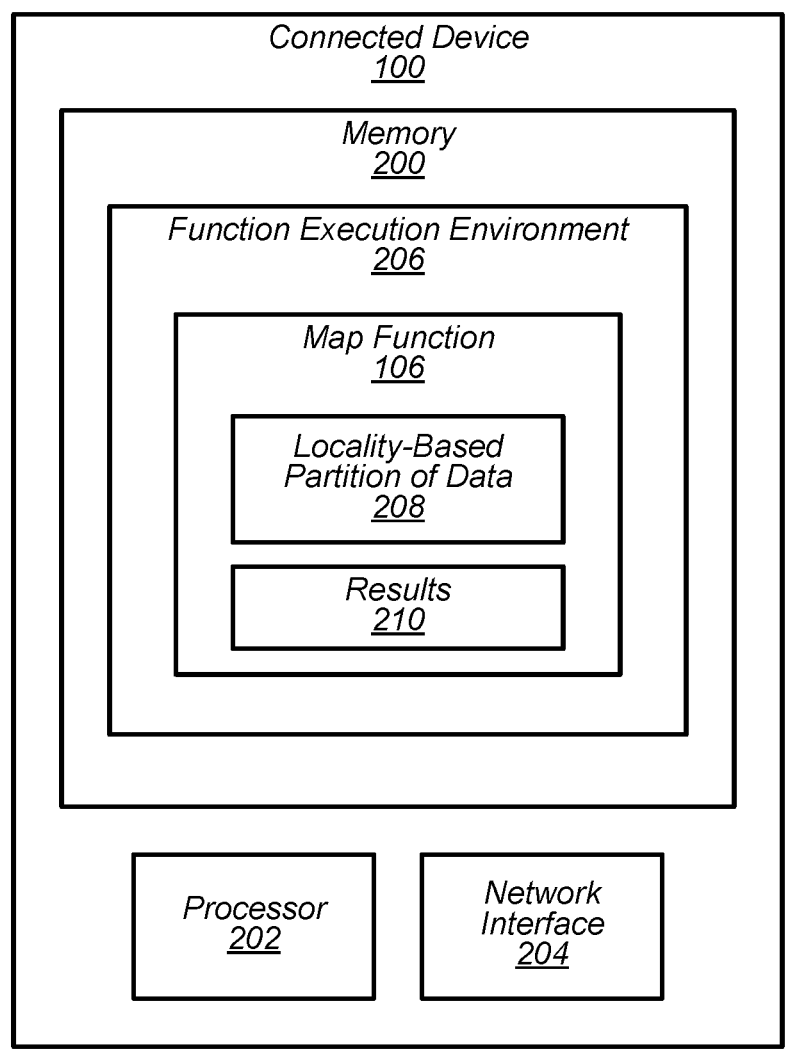
FIG. 2 is a block diagram illustrating example components that implement a map function at a connected device, according to some embodiments.

FIG. 2 is a block diagram illustrating example components that implement a map function at a connected device, according to some embodiments. In the depicted embodiment, the connected device 100 includes a memory 200, a processor 202, and a network interface 204.

The memory includes a function execution environment 206 suitable for running a map function 106 or a reduce function 108. In some embodiments, the function execution environment may provide for event-driven execution of functions. For example, the map or reduce function may be invoked in response to the event-driven execution environment detecting a triggering event (e.g., receiving data from a data source device or from a map node). As described above, the map function 106 may process a locality-based partition of data 208 to produce one or more results 210, which may then may sent to a reduce node. In embodiments, one or more of the data source devices may be part of the connected device (e.g., within, attached, and/or couple to the connected device). For example, a temperature sensor may be included as part of the connected device before being shipped to a client for use. Moreover, some data source devices may include multiple data sources (e.g., sensors) that each provide different data to a given connected device.

In embodiments, the network interface 204 communicatively couples the connected device 100 to the local network. Thus, the connected device 100 transmits data to and/or receives data from one or more other data source devices, connected devices, or other endpoints via the network interface 204. In embodiments, the network interface 204 may transmit and receive data via a wired or wireless interface.

In various embodiments, the connected device 100 may provide high levels of security (e.g., encrypted messages) to protect data being communicated between connected devices and also between the connected device and the provide network. The connected device may provide a simple, yet powerful processor and/or operating system to provide platform-agnostic capabilities. In some embodiments, the size of one or more memories and/or one or more processors used by one or more servers of the provider network 102 to implement services (e.g., IoT service 104 or components of IoT service) may be at least an order of magnitude larger than the size of the memory and/or the processor used by the connected device 100. However, the connected device 100 may still be powerful enough to run a same or similar function execution environment 206 as one that runs on one or more servers of the provider network 102, in order to invoke and execute map and/or reduce functions (e.g., event-driven functions).

In some embodiments, the function execution environment may provide for event-driven execution of one or more map functions and/or one or more reduce functions. For example, a map function 106 may be invoked in response to an event listener (e.g., running within the memory 200) receiving data from a data source device. The map function 106 may process the data to generate one or more results 210. A reduce function 108 may then be invoked on the same connected device 100 (e.g., by the same function execution environment and/or within the same memory 200) in response to the generation of the one or more results 210. The reduce function may process the one or more results received from the map function to generate another one or more results, which may then be sent to another reduce node of the client network or to a remote provider network for further processing.

In embodiments, the function execution environment may provide for event-driven execution of any number of map functions and/or any number of reduce functions, as described above for a single map and reduce function. For example, a map function 106 may be invoked to process data received from one or more sensors to generate one or more results, while another map function 106 may be invoked to process data received from a different one or more sensors to generate another one or more results. In embodiments, a one reduce function may be invoked to process the one or more results and another reduce function may be invoked to process the other one or more results.

Figure 3:
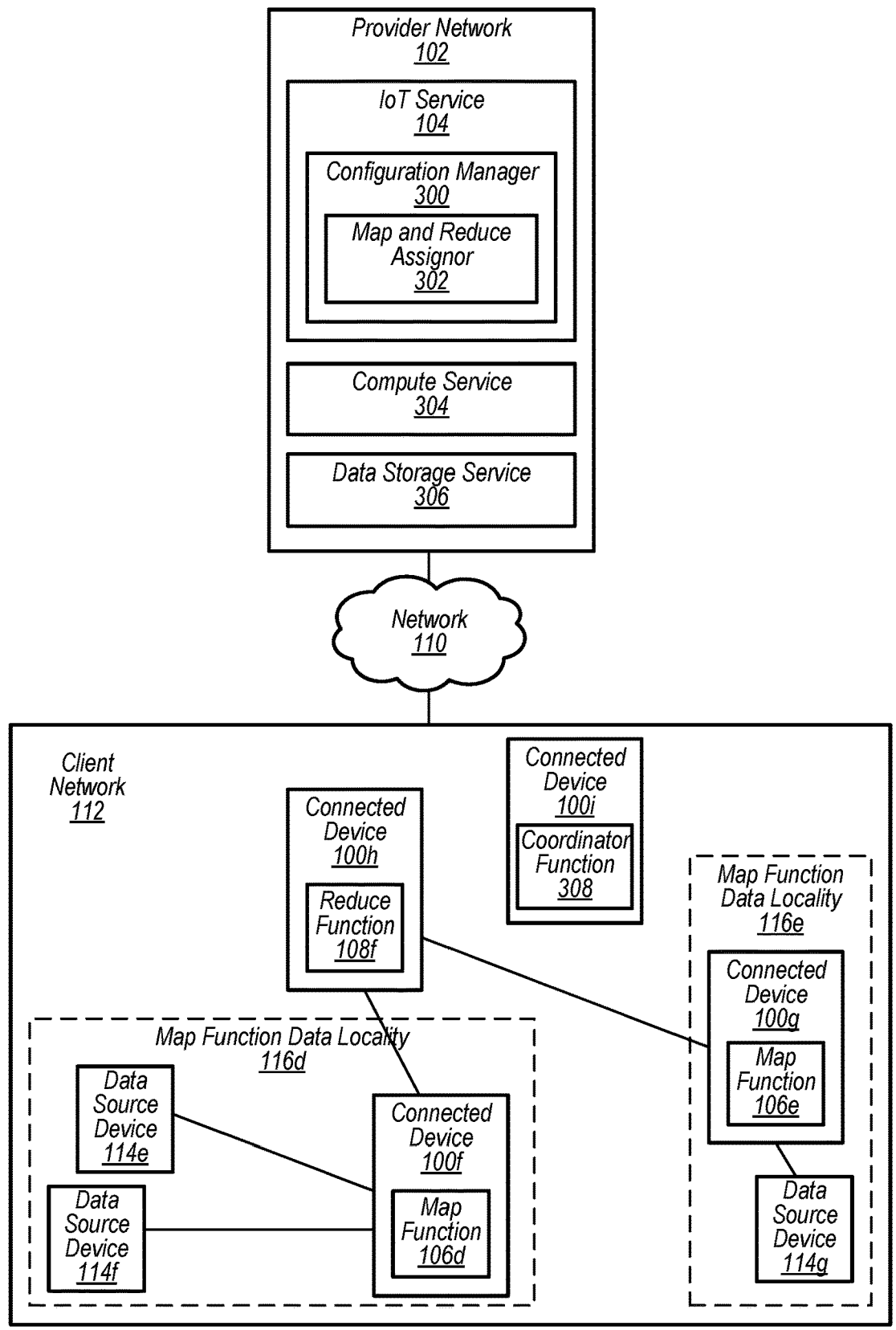
FIG. 3 illustrates a system for configuring and implementing data locality-aware MapReduce using IoT devices, according to some embodiments.

FIG. 3 illustrates a system for configuring and implementing data locality-aware MapReduce using IoT devices, according to some embodiments. In the depicted embodiment, an IoT service 104 of a provider network 102 includes a configuration manager 300 for allowing a client to specify a configuration for a MapReduce system using a client network.

As shown, the configuration manager 300 includes a map and reduce assignor 302 that may be used by a client/user (e.g., via an application programming interface (API), web service interface, graphical user interface, etc.) to assign map functions 106 and/or reduce functions 108 to different connected devices 100 of the client network 112, and to perform any other configuration instructions to implement a MapReduce system at the client network 112. For example, the configuration manager 300 may allow a client/user to assign one or more data source devices 114 and a connected device 100 (or map function 106) to the same map function data locality 116.

The IoT Service may then deploy the map functions 106 and/or reduce functions 108 via a wide-area network 110 (e.g., the Internet) to respective connected devices 100 of the client network 112 to operate as map nodes and/or reduce nodes of the MapReduce system. As shown, connected devices 100f and 100g respectively include map functions 106d and 106e. Further, connected device 100h includes reduce function 108f.

In embodiments, the provider network 102 also includes a compute service 304 and a data storage service 306. The compute service 304 may be used to provide various computing services to a client, such as providing one or more map nodes and/or reduce nodes for use by the MapReduce system. For example, the compute service may provide a reduce node to receive output from respective map functions of the client network. In embodiments, the compute service may provide one or more aggregation nodes to aggregate output from respective map functions and/or reduce functions of the client network.

In some embodiments, the compute service may provide one or more map nodes and/or reduce nodes as backup nodes to receive and process data when map nodes and/or reduce nodes of the client network become overloaded or fail. In embodiments, when map nodes and/or reduce nodes of the client network become overloaded or fail, then one or more map nodes and/or reduce nodes of a remote network (e.g., another network owned or managed by the client) may serve as backup nodes to receive and process the data. In various embodiments, when map nodes and/or reduce nodes of the client network become overloaded or fail, then one or more map nodes and/or reduce nodes of the local client network may serve as backup nodes to receive and process the data (e.g., the data is re-distributed across nodes of the local client network).

In embodiments, the data storage service 306 stores results produced by the compute service. The results may then be downloaded and/or accessed by a client/user (e.g., via an application programming interface (API), web service interface, graphical user interface, etc.).

As depicted, data source device 114e and data source device 114f and the connected device 100f are assigned to the map function data locality 116d. In embodiments, data source device 114a and connected device 100a may be assigned to the same map function data locality 116a by a client during configuration of the MapReduce system based on the location of the devices and/or other reasons, as described above. Similarly, data source device 114g and data the connected device 100g are assigned to the map function data locality 116e.

As described above, the configuration manager 300 may allow a client/user to assign one or more data source devices 114 and a connected device 100 (or map function 106) to the same map function data locality 116. Thus, a client may specify that data source device 114e and data source device 114f and the connected device 100f are to be assigned to the map function data locality 116d, and data source device 114g and data the connected device 100g are to be assigned to the map function data locality 116e.

In various embodiments, a client may specify, via the configuration manager, a coordinator function 308 to be deployed to a particular connected device 100i of the client network 112. The coordinator function 308 running on the connected device 100i may perform as a coordinator node for the MapReduce system of the client network 112. Thus, the coordinator function may perform any coordinating functions required to manage the operation of the map and/or reduce nodes and to perform any actions to mitigate effects of overloaded or failed nodes (e.g., redirecting data, as described above).

In embodiments, the coordinator function 308 may monitor for one or more conditions of the map and/or reduce nodes (e.g., conditions of the connected devices being used as map and/or reduce nodes). For example, the coordinator function 308 may monitor the health of one or more map and/or reduce nodes and in the event that the coordinator function 308 determines that health of a particular node falls below an acceptable level, the coordinator function 308 may redirect at least some data (e.g., sensor data or results from a map node) from being sent to the particular node to another one or more other nodes (e.g., load balancing). In some embodiments, the coordinator function 308 may instead replace the particular node with another one or more nodes be redirecting data to the other one or more nodes.

Figure 4:
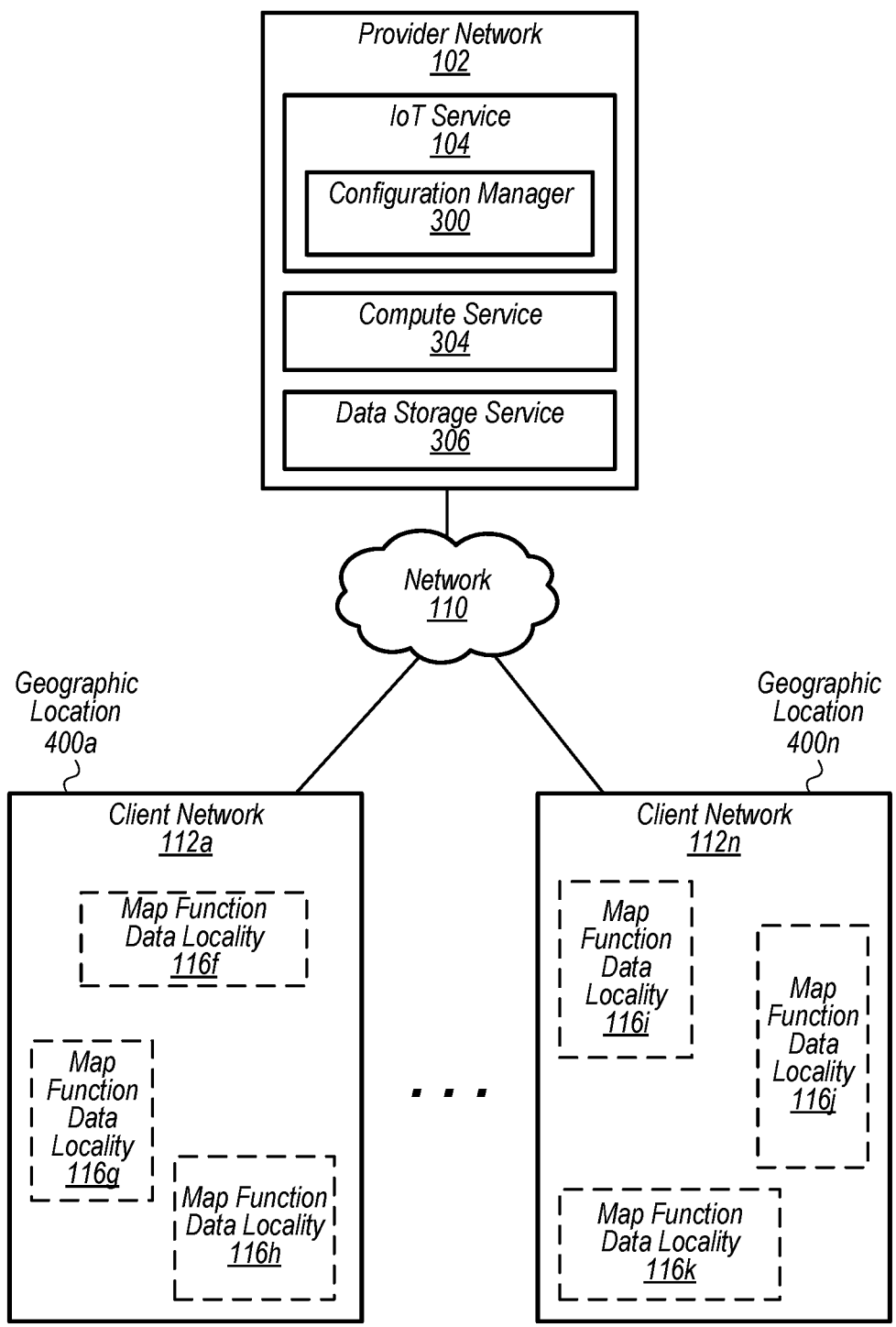
FIG. 4 illustrates a system for data locality-aware MapReduce using IoT devices across networks at different geographic locations, according to some embodiments.

FIG. 4 illustrates a system for data locality-aware MapReduce using IoT devices across networks at different geographic locations, according to some embodiments. As depicted, a provider network 102 includes an IoT service 104, a configuration manager 300, a compute service 304, and a data storage service 306. In embodiments, any of the functionality of connected devices described herein may be defined and/or configured via an API or user interface for the IoT service 104 (e.g., via the configuration manager 300).

In the depicted embodiment, the provider network 102 is connected to multiple client networks 112a-112n via the wide-area network 110 (e.g., the Internet). As shown, each of the client networks 112 is located at a different geographic location 400a-400n. For example, a business or other entity may own and/or manage the different client networks 400, which are located in various different cities and/or states.

As shown, each client network may include one or more map function data localities 116. For example, client network 112a includes map function data localities 116f, 116g, and 116h, while client network 112n includes map function data localities 116i, 116j, and 116k. In embodiments, the configuration manager 300 may allow a client/user to specify the map function data localities 116 across the different client networks 112, as well as any other configuration settings (e.g., map and reduce function assignments, etc.).

Similarly, the client/user may specify each given geographic location 400 as a higher level map function data locality that encompasses multiple map function data localities. For example, the client/user may specify the geographic location 400a as a map function data locality that encompasses map function data locality 116f, map function data locality 116g, and map function data locality 116h. In this way, any number of levels of map function data locality hierarchies may be specified during configuration or configuration changes.

In embodiments, the configuration manger 300 may allow a client/user to specify one or more reduce nodes of the compute service 304 to receive one or more results from map nodes and/or reduce nodes of each of the client networks 112. Thus, each MapReduce system of each client network may be a part of a larger MapReduce system that includes map and reduce nodes at many different geographic locations and corresponding map function data localities. As described above, this may allow a client to process a vast amount of data, while using much less network bandwidth for transmitting data to the provider network. This is due to the nature of implementing map functions at the client site, where the data is being generated and collected (e.g., at the map function data localities).

Figure 5:
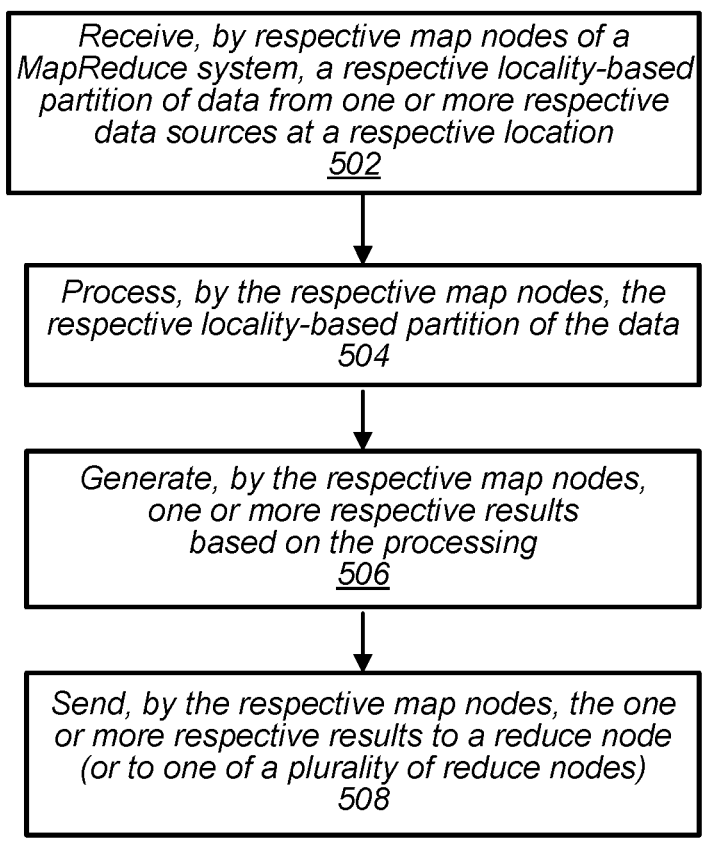
FIG. 5 is a flow diagram illustrating the processing of locality-based partitions of data by map functions, according to some embodiments.

FIG. 5 is a flow diagram illustrating the processing of locality-based partitions of data by map functions, according to some embodiments. One or more portions of the illustrated processes of FIGS. 5-7 may be performed via one or more components or services of a provider network 102 and/or connected devices 100.

At block 502, a respective map nodes of a MapReduce system receive a respective locality-based partition of data from one or more respective data sources at a respective location. At block 504, the respective map nodes process the respective locality-based partition of the data.

At block 506, the respective map nodes generate one or more respective results based on the processing. At block 508, the respective map nodes send the one or more respective results to a reduce node. In embodiments, different map nodes send respective results to different reduce nodes, as described above. Thus, in embodiments, a MapReduce system of a client network may use any number of map nodes/functions, any number of reduce nodes/functions, any number of data source devices, and any number of map function data localities.

Figure 6:
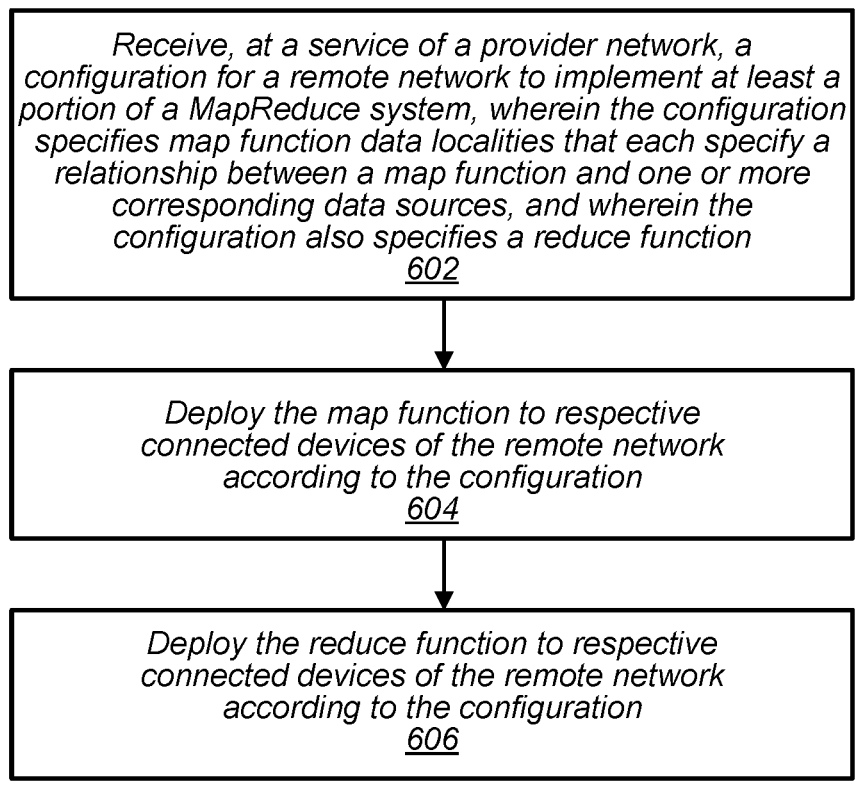
FIG. 6 is a flow diagram illustrating deployment of map and reduce functions from a provider network to connected devices of a remote network, according to some embodiments.

FIG. 6 is a flow diagram illustrating deployment of map and reduce functions from a provider network to connected devices of a remote network, according to some embodiments. At block 602, a configuration manager receives a configuration for a remote network (e.g., a client network) to implement at least a portion of a MapReduce system, wherein the configuration specifies map function data localities that each specify a relationship between a map function and one or more corresponding data sources. The configuration may also specify a reduce function.

In some embodiments, the configuration manager and any other described functionality may be installed locally at the client network. Thus, all of the functions described for the provider network may, in some embodiments, be provided by one or more computing devices (e.g., connected devices or other computing devices) of the local client network.

At block 604, the configuration manager deploys the map function to respective connected devices of the remote network according to the configuration. At block 606, the configuration manager deploys the map function to respective connected devices of the remote network according to the configuration.

Figure 7:
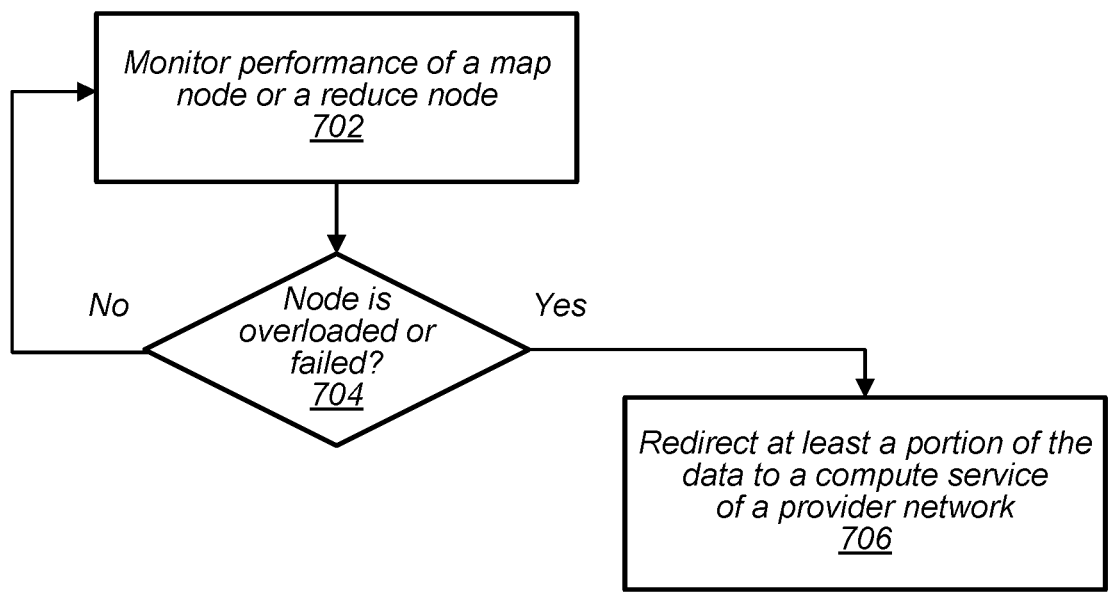
FIG. 7 is a flow diagram illustrating the redirecting of data from a map node or a reduce node of a MapReduce system to a compute service of a provider network when a node is overloaded or fails, according to some embodiments.

FIG. 7 is a flow diagram illustrating the redirecting of data from a map node or a reduce node of a MapReduce system to a compute service of a provider network when a node is overloaded or fails, according to some embodiments.

In some embodiments, the functions described in the illustrated process may be performed by one or more coordinator nodes, such as coordinator node 308 of FIG. 3. In embodiments, the functions described in the illustrated process may be performed by one or more of the map nodes/functions and/or reduce nodes/functions. In embodiments, at least some of the functions are performed by a coordinator node and at least some are performed by one or more of the map nodes/functions and/or reduce nodes/functions.

At block 702, a coordinator node monitors performance of a particular map node or a reduce node. At block 704, the coordinator node determines whether the particular node is overloaded or has failed. If so, then at block 706, the coordinator node redirects at least a portion of the data that would have been processed by the particular node to a compute service of a provider network.

In embodiments, the coordinator node may instruct an overloaded reduce node to redirect at least a portion of results from one or more map nodes to another reduce node of a remote provider network. If the reduce node failed, then the coordinator node may instruct one or more map nodes to redirect results to one or more other reduce nodes located within the client network and/or the provider network.

In some embodiments, the coordinator node instructs an overloaded map node to redirect a locality-based partition of data to a map node of a remote provider network. At a later point in time, a particular reduce node of the MapReduce system of the client network receives processed data from the remote provider network, wherein the processed data is the result of the map node of the provider network processing the locality-based partition of data.

In embodiments, the coordinator node or another computing device of the client network may perform a cost function to determine whether to redirect data to another compute node or to a node of the provider network. For example, the cost function may weigh the importance level or priority level of the data against the amount of time required to transmit the data to the provider network or the bandwidth required to transmit the data to the provider network. Dependent on the result, the coordinator node redirects the data to the other compute node of the local network or to the provider network.

Figure 8:
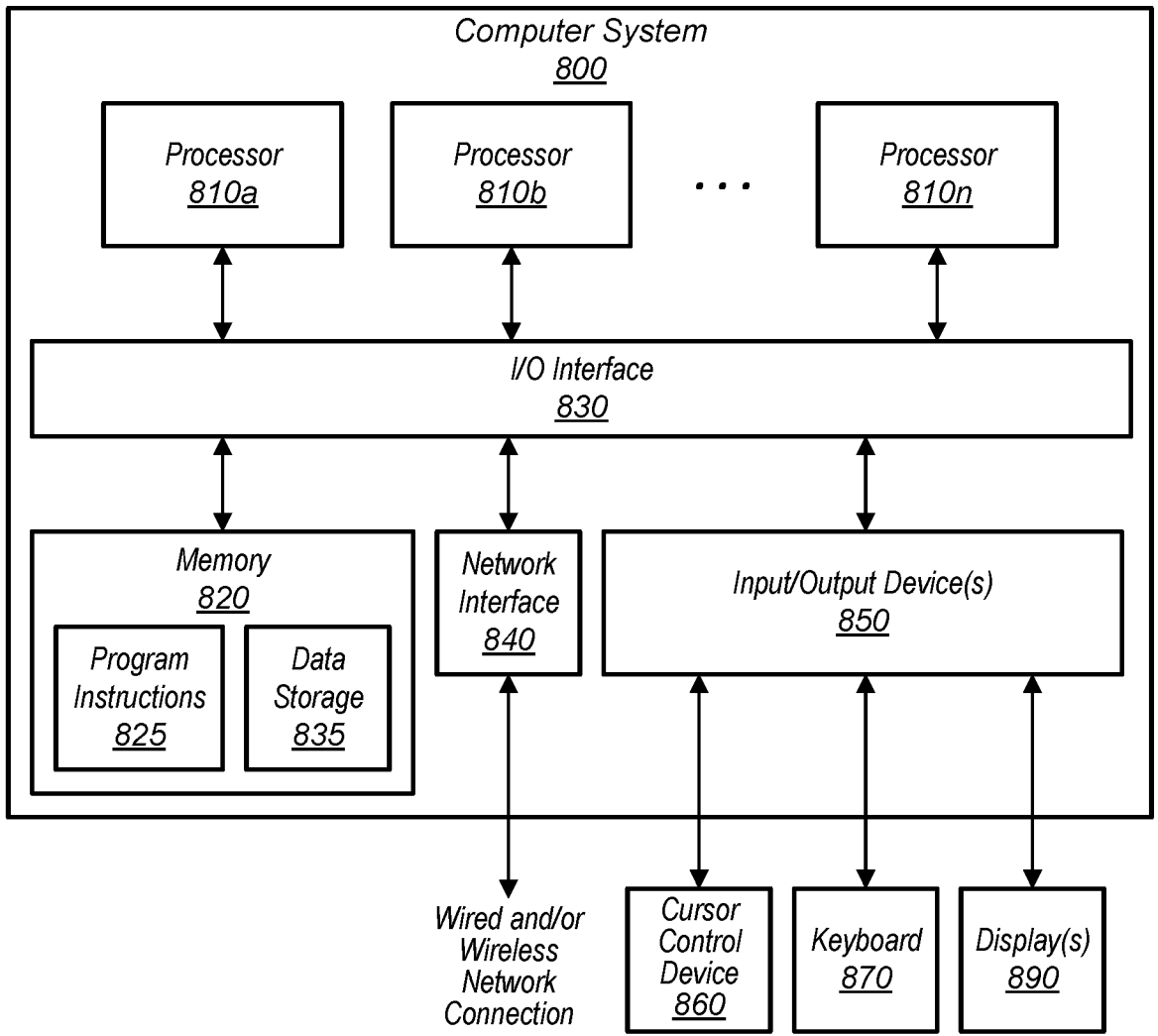
FIG. 8 is a block diagram illustrating an example computer system that implements some or all of the techniques described herein, according to some embodiments.

Any of various computer systems may be configured to implement processes associated with data locality-aware MapReduce using IoT devices. For example, FIG. 8 is a block diagram illustrating one embodiment of a computer system suitable for implementing at least some of the systems and methods described herein. In various embodiments, the connected devices 100, the data source devices 114, computing devices that implement services of the provider network 102, and/or any other described components may each include one or more computer systems 800 such as that illustrated in FIG. 8 or one or more components of the computer system 1200 that function in a same or similar way as described for the computer system 1200.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between the shippable storage device 100 and other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the connected devices, data source devices, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of connected devices, respectively comprising:
one or more processors; and
one or more memories having stored thereon instructions, which when executed by the one or more processors, cause the one or more processors to implement a map node of a MapReduce system, wherein one of the map nodes is configured to:
receive a locality-based partition of data from one or more data source devices that share a location with the map node;
process the locality-based partition of data;
generate one or more results based on the processing; and
send the one or more results to a reduce node, and
wherein another of the map nodes is configured to:
receive another locality-based partition of the data from one or more other data source devices that share another location with the other map node;
process the other locality-based partition of the data;
generate one or more other results based on the processing; and
send the one or more other results to the reduce node or a different reduce node.

2. The system as recited in claim 1, wherein to send the one or more results to the reduce node, the map node is configured to:
send the one or more results to a compute service of a remote provider network.

3. The system as recited in claim 1, wherein the system further comprises at least another connected device, the other connected device comprising:
one or more processors; and
one or more memories having stored thereon instructions, which when executed by the one or more processors, cause the one or more processors to implement the reduce node of the MapReduce system, wherein the reduce node is configured to:
receive the one or more results;
process at least a portion of the one or more results according to a reduce function;
generate one or more additional results based on the processing; and
send the one or more additional results to an endpoint.

4. The system as recited in claim 3, wherein to send the one or more additional results to an endpoint, the reduce node is configured to:
send the one or more additional results to a remote provider network.

5. The system as recited in claim 3, wherein the reduce node is configured to:
determine that the reduce node is overloaded; and
redirect at least a portion of the one or more results to another reduce node of a remote provider network.

6. A method, comprising:
receiving, by respective map nodes of a MapReduce system, a respective locality-based partition of data from one or more respective data source devices at a respective location, wherein a given one or more respective data source devices share a location with a given map node and another one or more respective data source devices share another location with another map node;
processing, by the respective map nodes, the respective locality-based partition of the data;
generating, by the respective map nodes, one or more respective results based on the processing; and
sending, by the respective map nodes, the one or more respective results to a reduce node or to one of a plurality of reduce nodes.

7. The method as recited in claim 6, further comprising:
sending, by the respective map nodes, the one or more respective results to a reduce node of a compute service of a remote provider network.

8. The method as recited in claim 6, further comprising:
receiving, by a reduce node of the MapReduce system, the one or more respective results;
processing, by the reduce node, at least a portion of the one or more respective results;
generating, by the reduce node, one or more additional results based on the processing; and
sending, by the reduce node, the one or more additional results to an endpoint.

9. The method as recited in claim 8, further comprising:
sending, by the reduce node, the one or more additional results to a compute service of a remote provider network.

10. The method as recited in claim 8, further comprising:
determining, by the reduce node, that the reduce node is overloaded; and
redirecting, by the reduce node, at least a portion of the one or more respective results to another reduce node of a remote provider network.

11. The method as recited in claim 6, further comprising:
determining, by one of the map nodes, that the map node is overloaded;
receiving, by the map node, an additional locality-based partition of data from one or more data source devices of the map node; and
redirecting, by the map node, the additional locality-based partition of data to a map node of a remote provider network.

12. The method as recited in claim 11, further comprising:
receiving, by a particular reduce node of the MapReduce system, processed data from the remote provider network, wherein the processed data is based on the additional locality-based partition of data previously sent from the map node of the MapReduce system to the map node of the remote provider network.

13. The method as recited in claim 8, further comprising:
determining, by a coordinator node of the MapReduce system, that the reduce node has failed; and
redirecting, by the coordinator node, results from one or more map nodes to a reduce node of a compute service of a remote provider network.

14. The method as recited in claim 8, further comprising:
determining, by a coordinator node of the MapReduce system, that the reduce node is overloaded; and
redirecting, by the coordinator node, at least a portion of results from one or more map nodes to a reduce node of a compute service of a remote provider network.

15. A non-transitory computer-readable storage medium storing program instructions that, when executed by one or more computing devices for a service of a provider network, cause the one or more computing devices to implement:
receiving, at the service of the provider network, an indication of a configuration for a remote network to implement at least a portion of a MapReduce system, the configuration specifying:
a plurality of map function data localities, wherein each map function data locality specifies a relationship between a map function and one or more corresponding data source devices that provide data for the map function; and
deploying the map function to respective connected devices of the remote network according to the configuration, wherein the map function is configured to, when implemented by individual ones of the respective connected devices:
receive a locality-based partition of data from the one or more data source devices, wherein the one or more data source devices share a location with the connected device that implements the map function and another one or more data source devices share another location with another of the connected devices that also implements the map function;
process the locality-based partition of the data;
generate one or more results based on the processing; and
send the one or more results to a reduce node.

16. The non-transitory, computer-readable storage medium of claim 15, wherein the configuration further specifies a reduce function to process one or more results of one or more respective map functions, and wherein the program instructions cause the one or more computing devices to further implement:
deploying the reduce function to other respective connected devices of the remote network according to the configuration, wherein the reduce function is configured to, when implemented by individual ones of the other respective connected devices:
receive the one or more results of the one or more respective map functions;
process at least a portion of the one or more results;
generate one or more additional results based on the processing; and
send the one or more additional results to an endpoint.

17. The non-transitory, computer-readable storage medium of claim 16, wherein the endpoint is a compute service of the provider network.

18. The non-transitory, computer-readable storage medium of claim 16, wherein the program instructions cause the one or more computing devices to further implement:
receiving an indication of at least one of a map function or a reduce function of a compute service of the provider network to perform processing of one or more locality-based partitions of the data or at least a portion of the one or more results generated by one or more map functions.

19. The non-transitory, computer-readable storage medium of claim 15, wherein the program instructions cause the one or more computing devices to further implement:
receiving, at the service, an indication of a reduce function of a compute service of the provider network to receive the one or more results generated by one or more map functions of the remote network.

20. The non-transitory, computer-readable storage medium of claim 15, wherein the program instructions cause the one or more computing devices to further implement:
receiving, at the service, an indication of a coordinator function of a compute service of the provider network to coordinate operations of at least one map node or reduce node of the remote network.

* * * * *